F. L. RICHARDSON.
VAPOR OR GASEOUS FLUID ADMINISTERING APPARATUS FOR ANESTHESIA.
APPLICATION FILED JULY 11, 1916.
1,286,109.
Patented Nov. 26, 1918.
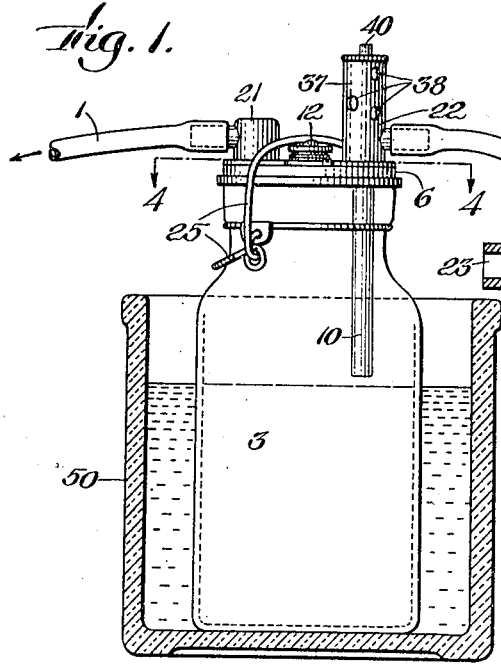
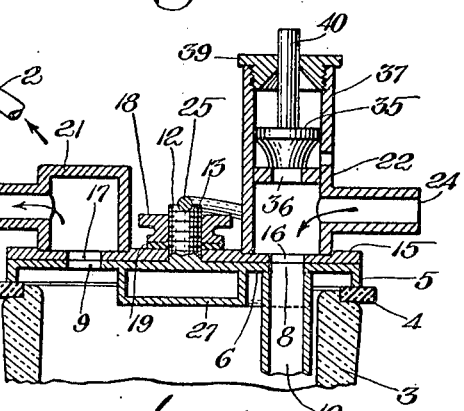
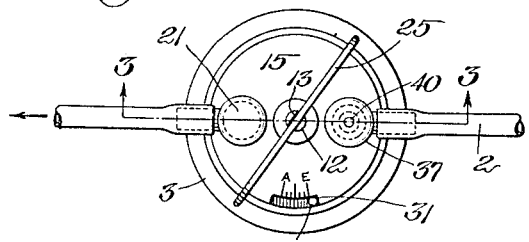
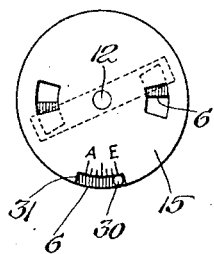
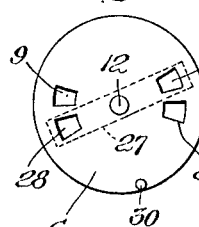
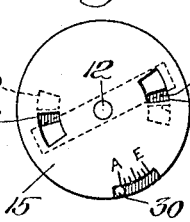
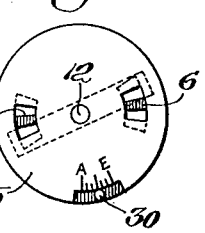
Inventor:
Frank L. Richardson,
by Roberts Roberts Cushman
Attorneys.

UNITED STATES PATENT OFFICE.

FRANK L. RICHARDSON, OF BOSTON, MASSACHUSETTS, ASSIGNOR TO THE TETER MANUFACTURING COMPANY, OF CLEVELAND, OHIO, A CORPORATION OF OHIO.

VAPOR OR GASEOUS FLUID ADMINISTERING APPARATUS FOR ANESTHESIA.

1,286,109.  Specification of Letters Patent.  Patented Nov. 26, 1918.

Application filed July 11, 1916. Serial No. 108,699.

*To all whom it may concern:*

Be it known that I, FRANK L. RICHARDSON, a citizen of the United States, and resident of Boston, in the county of Suffolk and State of Massachusetts, have invented new and useful Improvements in Vapor or Gaseous Fluid Administering Apparatus for Anesthesia, of which the following is a specification.

My invention relates to apparatus for the administration of gases or vapor by inhalation, for instance for the purpose of maintaining anesthesia by administration of a continuous supply of a mixture of air, [or oxygenated air, oxygen or other gases] and the vapor of a volatile anesthetic such as ether. Objects of my invention are to provide simple apparatus for the above and other related purposes which shall be portable, small in compass, certain in operation, and adapted thoroughly and accurately to admix two or more fluids or gases in a predetermined relation.

It has heretofore been proposed to maintain anesthesia by continuously administering a mixture of air and a vapor of ether, or by so administering a mixture of air and the vapors of two or more different volatile anesthetics, and I am aware of sundry more or less complicated vapor forming and mixing devices for the above purposes. So far as I am aware, however, no simple unitary apparatus exists enabling the continuous formation and administration of a predetermined and readily variable mixture of air [or oxygenated air, hereinafter referred to as "air"] and the anesthetic-saturated air or vapor, hereinafter referred to as "vapor." Further objects of my invention are, therefore, to provide a unitary and portable device adapted to maintain a continuous flow at a constant pressure or a constant maximum pressure of a known and determinate mixture of air and the anesthetic vapor, and to provide means for readily varying the constitutuents of the mixture, and means for maintaining the relative proportions of the mixture at variable pressures. I have so designed my apparatus as to permit it to be used in connection with vessels readily found in the average household.

In the illustrative form of my devices shown in the accompanying drawings,—

Figure 1 is a side elevation partly in vertical section;

Fig. 2 is a plan of the valve mechanism;

Fig. 3 is a vertical cross-section on the line 3—3 of Fig. 2;

Fig. 4 is a horizontal section on the line 4—4 of Fig. 1;

Fig. 5 is a vertical section on the line 5—5 of Fig. 4;

Fig. 6 is an under plan of the vaporizing chamber valve base shown in Fig. 3;

Figs. 7 and 8 are respectively plans above the valve base and valve cap; and

Figs. 9 and 10 are views corresponding to Fig. 7 illustrating different operative positions of the valve cap.

The apparatus as a whole comprises any suitable kind of inhaler, mouth-tube or other applicator, not shown, which may be attached to or form a part of a delivery tube 1, for conducting the anesthetic mixture into the air passages of the person or animal under anesthesia, and also comprises a pump of any suitable kind, such as a foot bellows, not shown, adapted to deliver air under pressure through pipe 2. The apparatus comprises a vaporizer adapted to mix with the air flowing in through intake tube 2, to a measured and predetermined degree of concentration, the vapor of a volatile fluid in the vaporizing chamber, which may be an ordinary glass jar, as shown at 3.

I have illustrated the jar 3 as provided with the usual packing or gasket 4. Upon this packing and adapted to be forced downward so that a depending flange 5 makes a gas-tight contact therewith, I provide a valve-base 6 having therein ports 8 and 9 respectively for ingress and egress of air and vapor, preferably segmental in form, as shown. The valve-base 6 may be an integral casting, and I prefer to provide in connection with the ingress port 8 a depending tube 10 serving to deliver an incoming blast of air on the surface of the ether or other volatile fluid in the jar 3, to secure relatively uniform evaporation for different levels of fluid.

On a central upstanding threaded stud 12 having a notch 13 at the top thereof I provide a rotatable valve cap 15 having ports 16 and 17 corresponding to the ports 8 and 9 of the valve-base, and valve cap 15 [which may be ground upon or otherwise surfaced to fit snugly on the upper face of base 6] is adjustably and frictionally held for rotation on base 6 by hand-nut 18 and washer 19.

Suitable pipe connections are provided for the ports 16 and 17 in the valve cap 15, as shown by means of domes 21 and 22 soldered or screwed on the upper surface of cam cap 15 and provided with nipples 23, 24 for the rubber tube connections 1 and 2.

The structure of the valve cap 15 and valve base 6 is adapted to be held securely against the gasket 4 by the ordinary bail-and-lever fastening 25, as illustrated in Figs. 1, 2 and 3. A jar such as jar 3 can be found in the usual household, and need not be carried by the anesthetist to patients' houses. Valve cap 15 is adapted to be turned on the stud 12 to equally cover and uncover ports 8 and 9 of the valve base 6, and when so turned will equally diminish or increase the area of the ingress and egress openings for air and vapor. Ports 16 and 17 preferably subtend a wider angle than the ports 8 and 9.

I provide suitable means for admitting to the delivery tube 1 a measured part of the fluid flowing through the apparatus, without admixture of vapor from the chamber 3, and for this purpose I may provide, as on the valve-base 6, a by-pass passage 27 having preferably segmental ports 28, 29 opening thereinto, and displaced angularly from the ports 8, 9 by the same relative distances, so that upon turning the valve cap 15 counter-clockwise, as illustrated in Fig. 4, the ports 28, 29 open to admit air from tube 2 directly to tube 1 before the ports 8 and 9 are covered and while ports 8 and 9 are still coincident with the ports 16, 17. Further movement of valve cap 15 will cause the by-pass passage 27 and the ports 28, 29 leading thereto to be further opened and the ports 8 and 9 to be further closed. The effect of this is to increase the effective areas of the by-pass openings and decrease the effective areas of both the ingress and delivery opening of the vaporizing chamber. The angular extent of ports 16 and 17 may be the same as the angular distance apart of like radial edges of ports 8, 9 and of ports 28, 29, whereby to cause the area at the passage through the divided fluid channel to remain constant in any position of the cap 15, as shown. When the parts are so positioned, then an edge of port 16 moves upon port 8 at the same time as the other edge of port 16 covers an edge of port 29, and the same relation simultaneously occurs between ports 17, 9 and 28. When cam cap 15 is rotated clockwise as viewed in Fig. 4, the ports 28, 29 are covered and the ports 8, 9 uncovered to an extent corresponding to the angular position of the cap 15. By full movement in this direction the by-pass passage 27 may be completely closed and all of the air delivered through chamber 3.

The air flowing through the by-pass 27 whenever it is open is delivered through dome 21 and therein thoroughly mixed with the vapor permitted to be formed and delivered from the jar 3, whatever the respective proportions of saturated vapor-bearing air and pure or oxygenated air may be.

Movement of valve-cap 15 is limited by a pin 30 in base 6 working in a peripheral recess 31 of valve-cap 15. A graduated scale marked on valve-cap 15 and read against a mark on pin 30 as an index shows the relative areas of opening of the two air-pressure currents, i. e., that flowing through the chamber 3 and that flowing through the by-pass 27. The position of the index on this scale is therefore a reliable measure of the concentration of the vapor passing to the subject.

As will be appreciated by those skilled in the art, the flow of the anesthetic gas or mixed vapor to the subject must be under pressure. I therefore provide my apparatus with a gravity-operating safety valve 35 normally seated on the diaphragm 36 held in an upward extension 37 of the air dome 22 to which the intake tube 2 delivers, in which extension holes 38 are provided for the free escape of air when the pressure is too high. A screw cap 39 in extension 37 provides a guide for the spindle 40 of valve 35, which spindle is visible and serves to indicate the adjusted maximum pressure by rising in response to pressure in the dome 22. The pressure may be adjusted by replacing the valve 35 by another of different weight, or by adding one or more annular weights to the valve 35.

The operation of my device will now be appreciated. When the relative adjustment is as shown in Fig. 7, vapor of a heavy or saturated concentration is delivered through pipe 1. When the relative position is that illustrated in Fig. 9, there is no vapor in the air being delivered through pipe 1. When the position is that illustrated in Fig. 10, a mixture of half air and half vapor is delivered through pipe 1, and positions between correspond to any desired proportion of vapor. In the use of my device, I prefer to immerse the jar 3 in warm water at about 95° Fahrenheit by use of any suitable vessel 50 as a water-bath.

I claim:

1. In apparatus for administering vapor, a vaporizing chamber, a closure therefor comprising a base having ports therein, and having therein a by-pass passage connecting two of said ports; valve means mounted thereon comprising a valve-cap having thereon a mixing chamber and having therein ports which respectively lead directly into said chambers, said cap being movable to determine the relative effective area of the ports in said base.

2. Apparatus for administering vapor having therein a vaporizing chamber and a closure therefor having therein a by-pass passage, ports leading into said chamber and said passage respectively, and an adjustable valve-cap adapted simultaneously to cover and uncover proportional areas of said ports respectively, in combination with a source of air supply adapted to be controlled by said ports and valve-cap, and a delivery tube adapted to receive currents of air and of vapor from both said passage and said chamber.

3. A volatile fluid vaporizing device comprising a receptacle for use as a vaporizing chamber, and a closure therefor comprising a base adapted to be fastened to said receptacle, said base having therein ports for ingress and egress and a by-pass passage have ingress and egress ports, in combination with intake and delivery tubes, and a valve-cap movable on said base adapted simultaneously to close and open ingress ports of said vaporizing chamber and by-pass respectively, and means on said closure connecting said egress ports and said delivery tube.

4. A volatile fluid vaporizing device having therein a vaporizing chamber and a closure therefor comprising a base having a by-pass passage therein and a rotatable valve-cap adapted to cover and uncover ports controlling ingress respectively to said chamber and to said by-pass passage, in combination with intake means on said valve, egress ports in said base for said chamber and said passage, and a mixing chamber on said valve adapted to receive air and vapor delivered by said egress ports.

5. A volatile fluid vaporizing device comprising a receptacle for use as a vaporizing chamber, and a closure therefor comprising a base adapted to be fastened to said receptacle, said base having therein ports for ingress and egress and a by-pass passage having ingress and egress ports, in combination with intake and delivery tubes, a dome and a safety valve therefor for said intake tube, and a valve-cap movable on said base adapted simultaneously to close and open ingress ports of said vaporizing chamber and by-pass respectively, and means on said closure connecting said egress ports and said delivery tube.

Signed by me at Boston, Massachusetts, this sixth day of July, 1916.

FRANK L. RICHARDSON.

Copies of this patent may be obtained for five cents each, by addressing the "Commissioner of Patents, Washington, D. C."